United States Patent [19]

Phillips et al.

[11] 4,229,972
[45] Oct. 28, 1980

[54] METHODS OF AND/OR MEANS FOR INDICATING THE LEVELS OF LIQUIDS

[75] Inventors: Dougald S. M. Phillips; Peter A. J. Phillips, both of Hamilton, New Zealand

[73] Assignee: AHI Operations Limited, Auckland, New Zealand

[21] Appl. No.: 42,106

[22] Filed: May 24, 1979

[30] Foreign Application Priority Data

May 26, 1978 [NZ] New Zealand ................. 187387

[51] Int. Cl.³ ........................................... G01F 23/24
[52] U.S. Cl. ................................ 73/304 R; 338/264; 338/302
[58] Field of Search ................. 73/304 R; 29/618; 338/38, 264

[56] References Cited

U.S. PATENT DOCUMENTS

| 829,161 | 8/1906 | Kjerulff | 73/304 R |
| 1,732,275 | 10/1929 | Martin | 338/38 |
| 2,797,284 | 6/1957 | Brooke | 73/304 R X |
| 2,936,516 | 5/1960 | Adair | 29/618 |
| 2,985,951 | 5/1961 | Solow | 29/618 |
| 3,465,588 | 9/1969 | Slavin | 73/304 R |

Primary Examiner—Daniel M. Yasich
Attorney, Agent, or Firm—Holman & Stern

[57] ABSTRACT

A wire wound resistor is vertically disposed in a vessel. The resistor has a former of between 20 mm and 45 mm diameter and resistance wire of a resistance of between 1 and 4 ohms per turn connected in the circuit of an A.C. bridge circuit. Impedance change is indicated on a display unit calibrated to indicate the change in level of liquid e.g. milk in the vessel. The resistance wire is laid on the former by applying ultrasonic sound energy to soften the former which is of polysulfone or polycarbonate and the wire embedded in the softened former material. The vessel is shaped at the lower end to assist in giving linear readings when the level of liquid is low.

8 Claims, 7 Drawing Figures

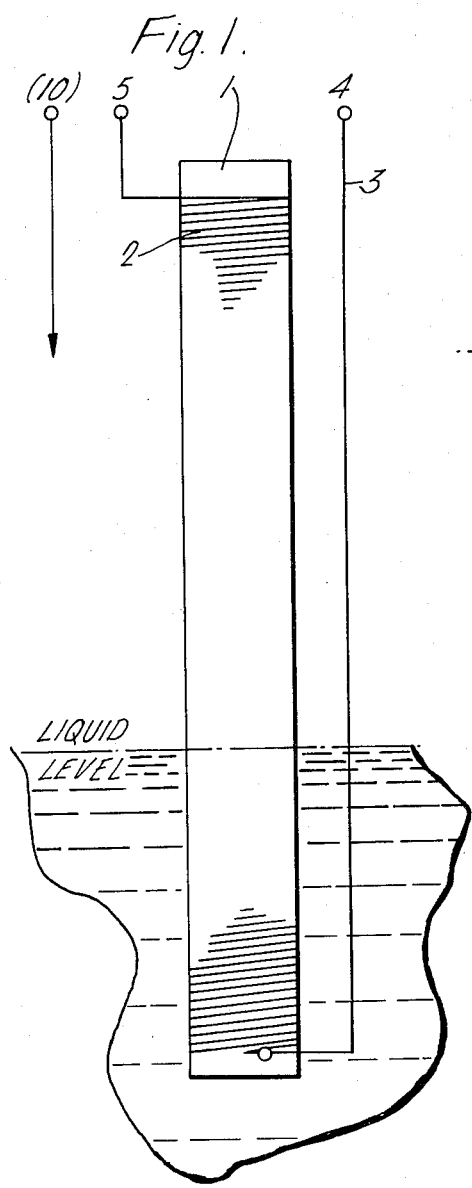
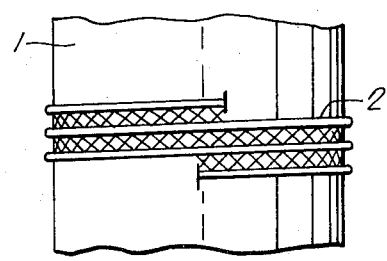
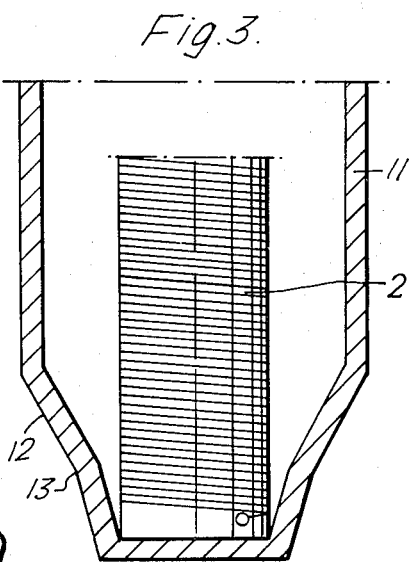
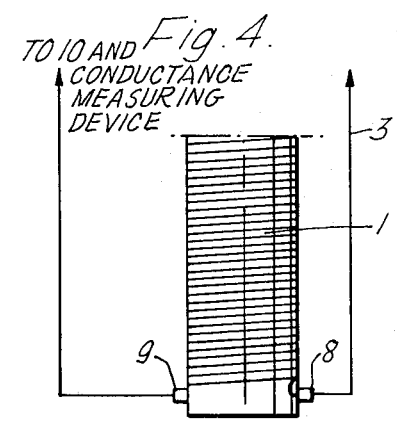

METHODS OF AND/OR MEANS FOR INDICATING THE LEVELS OF LIQUIDS

BACKGROUND AND SUMMARY OF THE INVENTION

This invention relates to methods of and/or means for indicating the levels of liquids and has been devised particularly though not solely for use in measuring the level of milk in a vessel.

It is an object of the present invention to provide methods of and means for measuring the level of liquid in a vessel which will at least provide the public with a useful choice.

Accordingly in one aspect the invention consists in a method of indicating the level of an electrically conducting liquid in a vessel, said method comprising the steps of allowing the liquid to rise in the vessel which contains a vertically disposed rod type resistor having an average cross sectional dimension between twenty and forty five mm and a resistance of between three and thirty two ohms per mm of length of the resistor, said method comprising the steps of allowing the liquid to rise in the vessel in a manner such that the liquid interconnects adjacent lengths of the resistor thus changing the impedance of the resistor appearing at the terminals thereof, measuring that change of impedance and converting the change of impedance into a display which indicates change of level in liquid in the vessel.

In a further aspect the invention consists in apparatus for indicating the level of an electrically conducting liquid in a vessel said apparatus comprising a rod type resistor disposed vertically in use in said vessel, said resistor having an average cross sectional dimension between twenty and forty five mm, and a resistance of between three and thirty-two ohms per mm of length of the resistor and being arranged so that increase in the level of liquid in the vessel causes some of the liquid in the vessel to interconnect adjacent lengths of the resistance wire to change the impedance thereof, means for measuring such change in impedance and display means on which change in level of liquid in the vessel is indicated.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

One preferred form of the invention will now be described with reference to the accompanying drawings in which, FIG. 1 is an elevation of a resistor for use in apparatus according to the invention, FIG. 2 is an enlargement of two turns of wire arranged according to FIG. 1, FIG. 3 shows the resistor of FIG. 1 disposed in a shaped vessel, FIG. 4 is a part figure as FIG. 1 showing different terminal connections.

DESCRIPTION OF THE PREFERRED EMBODIMENTS

Figure 5:
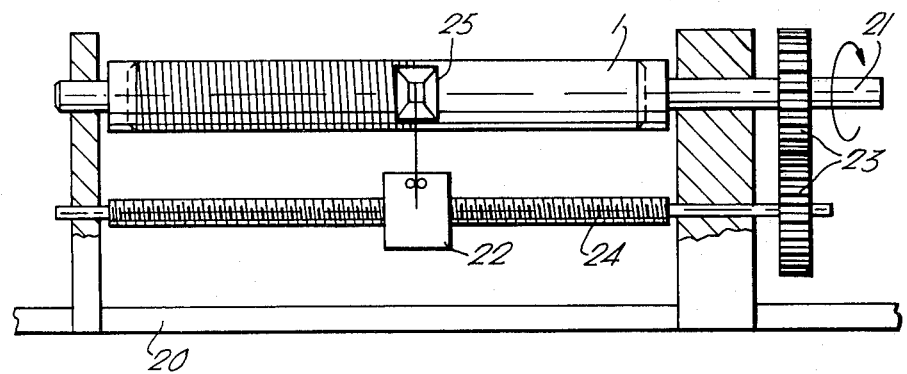
FIG. 5 is a plan view of a resistor winding arrangement.

Referring to the drawings, apparatus for indicating the level of an electrically conducting liquid in a vessel is provided for establishing the level of milk supplied from an individual cow for the purpose of checking on the performance of that cow.

Accordingly a rod type resistor is constructed comprising, for example, an insulating former 1 which is preferably closely wound with a fine gauge resistance wire 2. The former is of an average cross sectional dimension between twenty and forty-five mm, preferably twenty-five mm and is preferably cylindrical although other shapes which give a similar surface area may be used.

The unit described herein employs thirty-four to thirty-eight SWG nichrome wire and when such wire is wound on the twenty-five mm diameter former 1 for about four hundred mm of length, it has a total resistance of approximately four thousand ohms. The turns are closely spaced giving, for example, between three and eight turns per mm preferably five turns per mm and this gives a resistance of between one and four ohms per turn, typically about two ohms per turn. The range of resistance preferably lies between three and thirty-two ohms per mm of length.

An insulated lead 3 connects the lower end of the winding 2 to a terminal 4 and the upper end of the element 2 is connected to a terminal 5. The resistance of the element is measured by means of a bridge circuit e.g. a Marconi AC Wheatstone Bridge using alternating current at approximately 1000 Hz. Use of an alternating current prevents polarisation at the surface of the wire when immersed in milk. The bridge circuit supplies a display means in which the resistance is calibrated to give an indication of liquid level in a vessel (not shown in FIG. 1). With the apparatus described the element of 4000 ohms was reduced to an impedance of about 1500 ohms by complete immersion in milk. This reduction in impedance appearing at the terminals 4 and 5 is due to the milk, being a conducting liquid, allows current to flow from the exposed wire surface through the milk so that the turns of resistance wire below the liquid level are effectively in parallel with the body of milk.

Amongst other liquids of the same nature milk forms a sticky film which will not run off surfaces readily and thus the level indication with prior art measuring elements is usually higher than the actual liquid level once the element has been immersed and withdrawn again. The butterfat content of the milk may cause a film of fat to accumulate on the wire and thus increase the resistance of the contact between the wire and the milk. The calibration of an element not using the present invention can thus be extremely variable. In particular if a resistor comprising a single wire strand is used to measure the level of milk in a vessel the shunting of the single wire by the poorly conducting milk is very small so that extremely small changes of resistance must be determined. The present invention at least in the preferred form avoids these difficulties by the use of:

(a) The larger diameter of from twenty to forty-five mm for the former (b) The use of a fine resistance wire which results in a high total resistance of wire but because there are many turns a relatively low change in resistance per turn, namely of the order of one to four ohms as mentioned above. The total area of the wire in contact with the milk is thus sufficiently great to allow a good low resistance connection to the milk in contact with it. A film on non-immersed turns has little effect as the milk film represents a very high resistance cross section which is in parallel with the relatively low resistance of the wire itself. Thus referring to FIG. 2 in which the resistance per turn of wire is two to four ohms approximately, if the resistor has been immersed in milk and then withdrawn or more likely the liquid level has been reduced in the vessel, a film of milk represented by the crosses in FIG. 2 will present a high parallel resistance so that the shunt effect to each turn is very small and even the shunt effect over several mm of length of film is still not great. Furthermore because there are many turns of wire on the surface of the former 1 and such turns are exposed to the milk a considerable surface area of wire is available to provide low contact resistance between the milk and the turns of wire below the level of the milk. This is brought about by the large diameter of the former 1 and by the large number of turns of wire on that former. An added effect is that because there are many turns a very small change in liquid level can be detected. Experimentation has shown that the indication of milk level was substantially unaffected by the presence of surface contamination by milk fat and liquid milk or a form of milk. Even when the surface was coated slightly with petroleum jelly the indication remained correct. Two coats of polyurethane spray were necessary to prevent the element from providing a satisfactory working result. Thus the advantages of the invention stem from:

(a) The use of a large diameter former providing a long length of resistance wire to make contact with the milk in which it is immersed, results in a large contact area and even though the unit contact resistance between the wire and the milk may be high, the large total contact area results in a low resistance connection, to a thick (say 10 mm) layer or annulus of milk around the rod type resistor.

(b) At the same time the resistance of individual turns of the element is very low (one to four ohms) so that the resistance of a ring of milk between wires over the distance of one turn i.e. in the film has little effect as the milk represents a very high resistance due to its small cross section and this high resistance is in parallel with the one to four ohms of the turn of wire.

(c) The large area of resistance wire exposed to the milk provides a low "resistance of contact" to the milk because
 1. It provides a large area contact and
 2. The resistance of the metal to unit area is quite low.
Provided the vessel containing the milk is of great enough cross section to provide a thick, say 10 mm, layer or annulus of milk around the resistor, the parallel resistance of that body of milk is low enough to reduce the effective resistance of that portion of the resistor immersed in the milk by approximately 70%. This would not be the same with a single stand or narrow diameter element or a small number of turns of wire widely spaced on a narrow diameter former.

The effects of the invention are augmented by the use of an alternating current in the element. This alternating current has probably two effects, firstly it inhibits polarisation effects on the milk and secondly there is probably a capacitive coupling between the wires and the liquid even in the presence of a thin film of butterfat or other milk material. Thus there is a change in impedance of the resistor rather than a change in resistance only.

Where the liquid being measured (such as milk) varies in conductivity over a small range the resistance change with immersion will be affected by the conductivity to a small degree. If necessary this can be corrected by detecting the conductivity of the liquid and using this as the basis to suitably adjust the electrical or electronic measuring or converting system. Thus referring to FIG. 4 it is possible to provide two small conducting terminals for example, stainless steel studs 8 & 9 at a lower end of the resistance element former 1. One of these studs 8 is connected to the lower end of the resistance element and the other stud 9 is connected to a separate insulated lead to a terminal 10 and thence to the measuring system. An added advantage of this conductivity sensing system is the capability of using it to control an indicator system for monitoring the conductivity of the liquid. It can then be arranged, for example, to give an indication of cell count (mastitis level) as conductivity of milk may be directly related to mastitis levels. In regard to the detection of mastitis reference should be made to our New Zealand Pat. Nos. 180087 and 188810, respectively corresponding to U.S. Pat. Nos. 4,156,179 and U.S. application No. 982.

Because the change in resistance with immersion departs from linear relationship when very little of the resistance element is immersed, it is necessary or desirable to make a correction near the zero level.

Where the level is being used to measure volume of liquid, this can be done in various ways.

1. By shaping the resistance element former to give a change in resistance per unit length,
 2. By varying the spacing of the resistance element winding at the lower end,
 3. By shaping the containing vessel to alter relationship between volume and depth of liquid. The method described in item 3 above is the most easily applied and is illustrated in FIG. 4. Where the containing vessel 11 is provided with frustums of cones 12 and 13 having different slopes so that the liquid level rises more rapidly in the lower section 13 than in the upper section 12. The taper profiles are determined experimentally.

Figure 6:
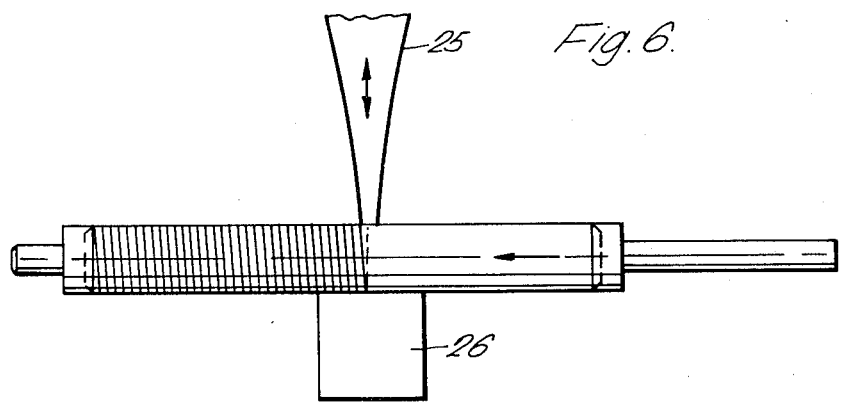
FIG. 6 is a sketch elevation of the construction shown in FIG. 5 and, FIG. 7 is a part section of the wall of a resistor former with resistance wires shown embedded therein.
Figure 7:

It will be apparent from the foregoing that the very fine wire with which the resistor is wound is somewhat fragile and therefore needs some protection. It is also necessary to provide a resistance element with a smooth surface without irregularities which could be difficult to clean and could provide areas for bacteria to collect. In FIGS. 5 & 6 there is illustrated a suitable winding machine comprising a frame 20 and a drive mechanism (not shown) driving a shaft 21 which rotates the former 1. The wire is led through a guide and tensioning means 22 which is moved along the length of the former 1 by lead screw gears 23 driving a lead screw 24 to give the desired pitch to the wire. An ultrasonic horn 25 is arranged to feed ultrasonic sound energy onto the wire where it first contacts the former which is, for example, made of a material such as polysulfone or polycarbonate. The wire heats and softens the former on making contact therewith. A fixed supporting anvil 26 is mounted below the ultrasonic horn 25 and this is made of a suitable energy absorbing material such as high density polyethylene. The effect of the ultrasonic horn is illustrated in FIG. 7 where previously wound turns 27 of wire are shown embedded in the former 1 and a turn 28 is shown above the level of the former 1 but with the former 1 softened therearound so that by the application of tension applied by the guide and tensioning means 22 the wire is pulled in to the surface of the former so that while an adequate surface area 29 is provided to enable the action of the invention to take place, yet the wire is adequately protected against washing or other procedures likely to cause damage thereto and the surface is relatively smooth for washing.

As mentioned above the vessel 11 is a flask of a milk meter such as the Waikato Mark III milk meter manufactured by AHI Plastic Moulding Company. The dimensions of the flask are not critical but of course will have an effect on the accuracy of measuring the volume of liquid. It is preferable that the walls of the vessel 11 are not closer than 10 mm to the wire on the former 1. Beyond this there is no real limit to the distance of the walls of the vessel from the former 1 except as stated that the greater this distance the more volume there will be for a given change of height and thus as stated the accuracy will be affected.

The present invention provides a simple interface between a standard milking system by providing means to give an electrical signal in proportion to the depth of milk in a flask or vessel which reflects a proportion of the total output from a particular cow. Previous attempts have been made in this regard on a number of occasions with varying degrees of success.

What is claimed as new is as follows:

1. A method of indicating the level of an electrically conducting liquid milk in a vessel which contains a vertically disposed rod type resistor having adjacent lengths having an average cross sectional dimension between twenty and forty-five mm and a resistance of between three and thirty-two ohms per mm of length of the resistor, said method comprising the steps of (a) allowing the liquid to rise in the vessel in a manner such that the liquid interconnects the adjacent lengths of the resistor thus changing the impedance of the resistor appearing at the terminals thereof, (b) measuring that change of impedance and (c) converting the change of impedance into a display which indicates change of level of liquid in the vessel, whereby said dimension enables the total area of the resistor in contact with the milk to be sufficiently great to allow a good resistance connection to the milk in contact with it and enables extremely small changes of impedance to be measured in step (b).

2. A method as claimed in claim 1 wherein step (a) is carried out by using a wire wound resistor having between three and eight turns per mm and a resistance of between one and four ohms per turn of resistance wire and so that the liquid interconnects adjacent turns of the resistor.

3. A method as claimed in claim 1 wherein the change of impedance in step (b) is measured by applying an alternating current to the terminals of the resistor and measuring the change in alternating current flowing through the resistor.

4. Apparatus for indicating the level of an electrically conducting liquid milk in a vessel, said apparatus comprising (a) a rod type resistor disposed vertically in use in said vessel, said resistor having an average cross sectional dimension between twenty and forty-five mm and a resistor of between three and thirty-two ohms per mm of length of the resistor, the resistor being arranged so that increase in the level of liquid in the vessel causes some of the liquid in the vessel to interconnect adjacent lengths of the resistor to change the impedance thereof, (b) means for measuring such change in impedance and (c) display means on which change in level of liquid in the vessel is indicated.

5. Apparatus as claimed in claim 4 wherein said resistor is a former wound with wire having between three and eight turns per mm and a resistance of between one and four ohms per turn and being arranged so that increase in the level of liquid in the vessel causes some of the liquid to interconnect adjacent turns of said wire.

6. Apparatus for indicating the level of an electrically conducting liquid in a vessel, said vessel comprising (a) a rod type resistor disposed vertically in use in said vessel, said resistor having an average cross sectional dimension between twenty and forty-five mm and a resistance of between three and thirty-two ohms per mm of length of the resistor, the resistor being arranged so that increase in the level of liquid in the vessel causes some of the liquid in the vessel to interconnect adjacent lengths of the resistor to change the impedance thereof, (b) means for measuring such change in impedance and (c) display means on which change in level of liquid in the vessel is indicated, wherein said resistor is a former wound with wire having between three and eight turns per mm and a resistance of between one and four ohms per turn and being arranged so that increase in the level of liquid in the vessel causes some of the liquid to interconnect adjacent turns of said wire, wherein said former is made of a softenable material such as polysulfone or polycarbonate and said resistance wire is embedded in said softenable material of the former with only a portion thereof exposed, whereby said dimension enables the total area of the wire in contact with the liquid to be sufficiently great to allow a good resistance connection to the liquid in contact with it and enables extremely small changes of impedance to be measured.

7. Apparatus as claimed in claim 5 wherein separately spaced studs or terminals are provided on said former and whereby the conductance of the liquid the level of which is being measured, can be measured by a conductance measuring device.

8. Apparatus as claimed in claim 5 wherein said vessel is provided with a plurality of frusta of cones at the lower end thereof, the lowermost of said plurality having a lesser slope than the next frustum for the purpose of assisting in giving a linear scale during the commencement of filling of the vessel.

* * * * *